United States Patent [19]

Robinson et al.

[11] Patent Number: 4,608,280

[45] Date of Patent: Aug. 26, 1986

[54] POLYMER CONCRETE COMPOSITION, METHODS FOR LINING PIPES AND FOR FILLING GIRTHWELD CONCRETE CUTBACKS USING THE COMPOSITION

[75] Inventors: Richard M. Robinson, Strassbourg, France; Gordon Svarc, Au, Switzerland

[73] Assignee: The Dow Chemical Company, Midland, Mich.

[21] Appl. No.: 645,584

[22] Filed: Aug. 30, 1984

[30] Foreign Application Priority Data

Sep. 6, 1983 [DE] Fed. Rep. of Germany ....... 3332080

[51] Int. Cl.$^4$ ...................... C04B 26/18; C04B 26/14; C08F 299/02; C08F 299/04
[52] U.S. Cl. .................................. 427/230; 427/239; 524/5
[58] Field of Search ..................... 524/5; 427/230, 239

[56] References Cited

U.S. PATENT DOCUMENTS

| | | | |
|---|---|---|---|
| 2,868,753 | 1/1959 | Morgan et al. | 524/5 |
| 3,377,406 | 4/1968 | Newey et al. | 260/837 |
| 3,538,036 | 11/1970 | Peters et al. | 524/5 |
| 4,233,204 | 11/1980 | Rubel | 260/40 R |

FOREIGN PATENT DOCUMENTS

| | | |
|---|---|---|
| 0062373 | 10/1982 | European Pat. Off. |
| 1455533 | 10/1966 | France . |
| 416426 | 1/1967 | Switzerland . |
| 1292034 | 10/1972 | United Kingdom . |

*Primary Examiner*—James R. Hoffman
*Attorney, Agent, or Firm*—H. David Russell

[57] ABSTRACT

This invention relates to a polymer concrete composition; to methods for lining pipes and for filling girthweld concrete cutbacks using the composition, and to a reusable mold for preparing filled girthweld concrete cutbacks. The polymer concrete composition contains no transition metal compounds and comprises a vinyl ester resin or an unsaturated polyester resin, a free radical initiator; a transition metal free, an accelerator which does not contain a transition metal.

The reusable mold comprises a separable sheath (10) having a means (21) for introducing a filler composition to the girthweld concrete cutback (40). The sheath is capable of conforming generally to the shape of the coated pipe (1, 2) or other coated conduit and circumscribing the entire circumference or perimeter of at least a portion of the pipe or other conduit. The mold further comprises a closure means (20) mounted on the separable sheath. The combination of closure means and the separable sheath operate in a manner such that, in one position, the pipe is free to move through the mold and, in a second position, the combination of the closure means and the sheath are such that the filler composition can be introduced to fill the cavity defined by the sheath and the concrete cutback of the two pipe sections being joined.

6 Claims, 1 Drawing Figure

U.S. Patent  Aug. 26, 1986  4,608,280
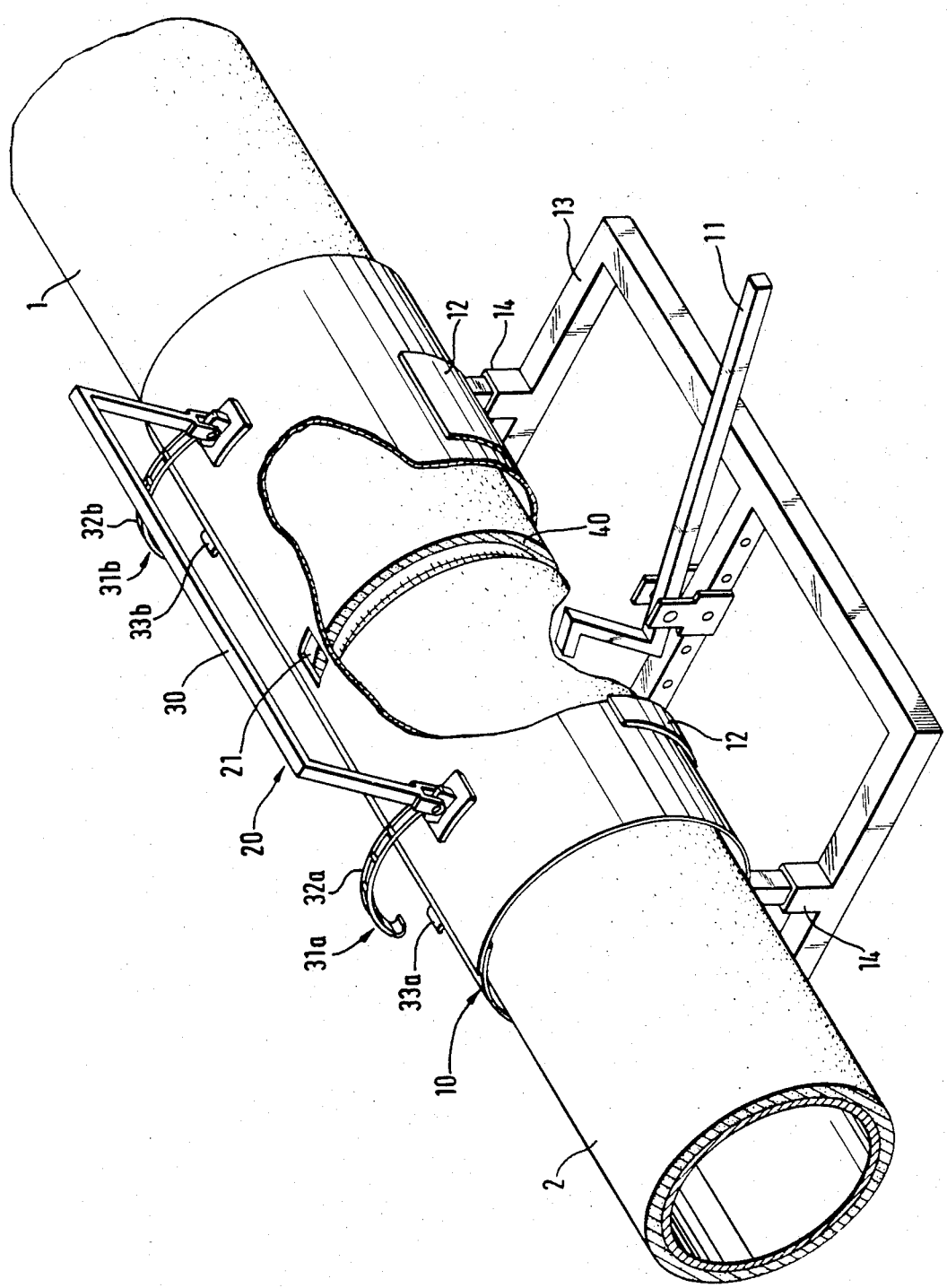

POLYMER CONCRETE COMPOSITION, METHODS FOR LINING PIPES AND FOR FILLING GIRTHWELD CONCRETE CUTBACKS USING THE COMPOSITION

BACKGROUND OF THE INVENTION

The present invention relates to a polymer concrete composition, to methods for lining pipes and for filling girthweld concrete cutbacks using the composition and to a reusable mold for filling girthweld concrete cutbacks.

In the laying of pipes or other conduits on the ocean floor, individual sections or lengths of the pipe or conduit, often being of a considerable length (e.g., 12 meters), are conventionally coated with concrete to give them a "negative buoyancy" so that the pipe will remain on the ocean floor during use. This is particularly necessary when a pipe having a diameter of greater than about 50 centimeters is used in transporting gas.

In general, the concrete coating is applied on shore and the individual coated pipe sections are then loaded on a barge for subsequent welding and installation. To allow the welding of the individual sections to one another, a small portion of each end of the pipe remains uncoated. Therefore, when welded, the joined pipe sections have an uncoated gap. To enable the pipe to enter the sea smoothly and to pro vide the joined pipe section with protection against physical and chemical damage once on the ocean floor, it is necessary to fill this girthweld concrete cut back.

There are various properties which any filler composition posses to be effectively employed in filling a girthweld concrete cutback. Specifically, to provide an efficient pipe laying operation, this filling operation including any required setting of the filler composition, is preferably completed in a relatively short time period of 10 to 15 minutes or less. In addition, moisture is commonly present during the cutback fill operation. Therefore, the filler composition must set and/or cure within this time period and in the presence of moisture to a material having sufficient physical properties such that the filled pipe can be further processed without damage.

The materials used to date in filling concrete cutbacks have not normally met these requirements. For example, the filling of girthweld concrete cutbacks has been accomplished by placing a metal sleeve or mold over the gap and filling this sleeve with molten mastic which solidifies as it cools. Unfortunately, the mastic does not set to a sufficiently strong material within the required time to allow further processing of the pipe without additional reinforcement such as the metal sleeve being present. Therefore, in conventional filling operations, the sleeve is not detached from the pipe (is not reusable) and sinks with the pipe to the ocean floor. This causes various other problems such as destroying fishnets by snagging. Moreover, filling cutbacks using the described method is labor intensive.

It has also been proposed to use a rigid polyurethane for filling girthweld concrete cutbacks. Unfortunately, the polyurethane materials generally exhibit an insufficient compressive strength to be employed without a metal sleeve or other reinforcement in the pipe-laying operation. In addition, the polyurethanes are, in general, absorbent which may cause more rapid corrosion of the pipe when it is exposed to the sea water.

Due to the action of the environment, over a period of time cement and/or concrete pipes, particularly sewer pipes, corrode. In the case of sewer pipes, for example, the $H_2S$ present in the environment contained by the walls of the pipe reacts with oxygen to form sulfuric acid. The acid reacts with the calcium carbonate contained in the pipe to form calcium sulfate and carbon dioxide. Calcium sulfate is a soft material which is susceptible to crumbling and is easily washed away. Thereby causing a reduction in the wall thickness of the pipe. The carbon dioxide causes surface embrittlement of the pipe.

As a means for reducing the corrosion of cement or concrete pipes, it has been proposed to line the pipe with a chemically resistant material. Although the pipe is cleaned and dried to some extent, often there is residual amounts of water present in the pipe or on the pipe's surface. Therefore, the composition selected to coat the pipe is required to be sufficiently resistant to this moisture such that it is capable of forming a continuous coating which adheres to the interior surface of the pipe. The coating must also be sufficiently chemically resistant to protect the pipe from corrosive environments in the pipe. These requirements have severely limited the choice of materials which can be employed to coat the interior of the pipe.

For example, it has been proposed to reduce corrosion of a concrete pipe by lining both new and used (previously installed) concrete pipes with polyvinylchloride (PVC). Even with a PVC liner in a new concrete pipe, the joints between two individual pipes are not protected and are still susceptible to corrosion. In coating used or previously installed concrete pipes with PVC, it has been proposed to use an in situ process whereby an endless tube of PVC is placed into the pipe and hot water or other means used to push the PVC against the pipe walls and to adhere the PVC liner to the concrete. This method for lining pipes is very expensive and labor intensive.

Another proposed method is to use a glass reinforced plastic, such as glass reinforced epoxy resin, to coat the interior walls of a concrete pipe. Glass reinforced plastic materials are difficult to apply to the interior surface of the concrete pipe. In order to effectively reduce corrosion, these materials must be applied as a relatively thick coating which reduces the inside diameter of the pipe. This is an undesirable effect.

In view of the deficiencies of the prior art, it remains highly desirable to provide a composition which possesses the required properties such that it can be effectively employed in the presence of water often found in filling girthweld concrete cutbacks or in a cleaned but not necessarily completely dried sewer pipe.

SUMMARY OF THE INVENTION

Accordingly, in one aspect, the present invention is such a composition. Specifically, the composition of the present invention is a polymer concrete composition which contains no transition metal compounds and comprises, a vinyl ester resin or unsaturated polyester resin, a free radical initiator, an accelerator which does not contain a transition metal and a filler.

European Patent Application, Publication No. 0062373 describes a polymeric composition which comprises a small amount of an unsaturated polyester or vinyl ester resin containing a free radical initiator and a major amount of an aggregate composition containing fly ash and sand. The exemplified polymer compositions are cured or set using relatively long time periods. This makes the disclosed compositions unsuitable for use in many applications including the filling or girthweld concrete cutback joints. Moreover, the specifically exemplified compositions do not cure effectively in the presence of water.

Alternatively, the polymer composition of the present invention is unique in that it will solidify and/or cure, in the presence of some amounts of water, to a suitably hard material having desirable physical strength, chemical resistance and adhesion to concrete or cement. Therefore, the moisture normally contained in sand or other filler or present on the walls of a pipe being lined does not significantly and adversely affect the solidification and/or curing of the composition. For this reason, the composition of the present invention is particularly useful in lining concrete pipes, particularly sewer pipes. The compositions of the present invention are also useful in the relining of manholes.

In the filling of a girthweld concrete cutback, the selection and proportions of the initiator and the accelerator are such that setting time of the composition is less than 10 minutes at 35° C. Due to the fact that the composition can be solidified and/or cured in a relatively short time period without external heating to a material having a sufficiently high compressive strength such that, even in the absence of a metal sleeve or other additional reinforcement, a filled girthweld concrete cutback prepared therefrom is not damaged during a pipe laying operation. For this reason, the composition of the present invention is particularly useful in the filling of a girthweld concrete cutback and, in another aspect, the present invention is a method for filling a girthweld concrete cutback using the described composition. In yet another aspect, the present invention is a method for lining pipe using the described composition.

Although the polymer concrete composition of the present invention can be employed with a non-reusable mold such as the mold heretofore employed in preparing girthweld concrete cutback, the advantages of the present invention are more generally recognized when a reusable mold, i.e., a mold which can be reused to fill more than one girthweld concrete cutback, is employed. In yet another aspect, the present invention is such a reusable mold. The mold comprises a separable sheath having a means for introducing a filler composition to the girthweld concrete cutback. The sheath is capable of conforming generally to the shape of the coated pipe or other coated conduit and circumscribing the entire circumference or perimeter of at least a portion of the pipe or other conduit. The mold further comprises a closure means mounted on the separable sheath. The combination of closure means and separable sheath operate in a manner such that, in one position, the pipe is free to move through the mold and, in a second position, the combination of the closure means and the sheath are such that the filler composition can be introduced to fill the cavity defined by the sheath and the concrete cutback of the two pipe sections being joined.

The described mold can effectively be reused for a substantial number of operations. Therefore, the disadvantages inherent with a non-reusable mold are eliminated.

DETAILED DESCRIPTION OF THE PREFERRED EMBODIMENTS

The polymer concrete composition of the present invention contains a vinyl ester resin or an unsaturated polyester resin or a compatible mixture thereof.

Vinyl ester resins are well known in the art and reference is made thereto for the purposes of this invention. Vinyl esters advantageously employed are those compounds prepared by reacting an epoxy compound, which can be either monomeric or polymeric, having one or more oxiranyl groups (i.e., C--°--C) in the molecule with an ethylenically unsaturated carboxylic acid. The epoxy compounds may be saturated or unsaturated aliphatic, alicyclic or aromatic hydrocarbons; inertly substituted aliphatic, alicyclic and aromatic hydrocarbons or combinations thereof.

Representative epoxy compounds include the glycidyl polyethers of polyhydric alcohols or polyhydric phenols, epoxidized novolacs, epoxidized fatty acids or drying oil acids as well as epoxidized unsaturated polyesters. Rubber-modified epoxy compounds such as the reaction product of one or more of the specified epoxy compounds with a carboxy terminated butadiene/acrylonitrile can also be employed as the epoxy component. Preferably, the epoxy compound used herein contains an average of at least 1, more preferably at least 1.1, oxiranyl group per molecule. Preferred epoxy compounds are the glycidyl polyethers of polyhydric alcohols or polyhydric phenols and combinations of these epoxides with one or more other epoxy compounds. The preferred epoxy compounds are usually made by reacting at least 2 moles of an epihalohydrin, preferably epichlorohydrin, or glycerol dihalohydrin with 1 mole of the polyhydric alcohol or polyhydric phenol and a sufficient amount of a caustic alkali to combine with the halogen of the halohydrin. An especially preferred epoxide is the glycidyl polyether of 2,2-bis(4-hydroxyphenol) propane having an epoxy equivalent weight from 180 to 2000.

Aliphatic, alicyclic or aromatic ethylenically unsaturated carboxylic acids can be used to esterify the polyepoxide. The acid can be either a mono- or dicarboxylic acid. Representative unsaturated monocarboxylic acids include acrylic acid, methacrylic acid, halogenated acrylic or methacrylic acid, cinnamic acid, crotonic acid, alphaphenylacrylic acid and mixtures thereof and hydroxyalkyl acrylate or methacrylate half-esters of dicarboxylic acids when the hydroxyalkyl group preferably has from 2 to 6 carbon atoms. The ethylenically unsaturated monocarboxylic acids such as acrylic or methacrylic acid are preferred in the preparation of the vinyl ester resin employed in this invention.

Processes for the esterification of the epoxy compounds with the ethylenically unsaturated carboxylic acid to form a vinyl ester are well known in the art and reference is made thereto for the purposes of this invention. Illustrative of such methods are set forth in U.S. Pat. Nos. 3,377,406; 3,420,914; 3,367,992 and 3,301,743. The vinyl ester resins will vary from liquid to solid and will generally possess free hydroxy, ethylenic and epoxide groups. Some or all of the pendant hydroxy groups on the vinyl ester resins may, if desired, be reacted with an acid anhydride, preferably a polycarboxylic acid anhydride such as maleic anhydride.

Although the polymer compositions of the present invention are preferably prepared from a vinyl ester resin, an unsaturated polyester can also suitably be employed in preparing said compositions. Unsaturated polyesters and their methods of manufacture are well known in the art and reference is made thereto for the purposes of this invention. Simply, the unsaturated polyesters are normally prepared by either the so-called diffusion or solvent process wherein saturated and/or unsaturated poly- (including di-) carboxylic acids and/or anhydrides of a polycarboxylic acid are polyesterified with an esterifying agent such as a polyhydric alcohol or alkylene oxide. In addition, the unsaturated polyesters may further be modified in a conventional manner such as by the reaction with other monomers.

The polycarboxylic acids and anhydrides of polycarboxylic acids can be aliphatic, alycyclic or aromatic or inertly substituted aliphatic, alycyclic or aromatic compounds and mixtures thereof. Representative of such materials are maleic acid, maleic anhydride, crotonic acid, itaconic acid and itaconic anhydride, fumaric acid and ortho-, iso- or terephthalic acid.

Representative esterifying agents useful in the preparation of the unsaturated polyesters include the polyhydric compounds such as the polyhydric alcohols, phenols and glycols and alkylene oxides as well as mixtures and adducts thereof. Preferred polyhydric compounds include glycerol, bisphenol A, and its alkylene oxide adducts such as propoxylated bisphenol A, pentaerythritol, ethylene glycol, propylene glycol and neopentyl glycol.

The vinyl ester resin or unsaturated polyester resin are generally employed in combination with a copolymerizable monomer which is typically an ethylenically unsaturated compound.

The copolymerizable monomers advantageously employed include the monovinylidene aromatic compounds such as styrene, vinyl toluene, halogenated styrenes and vinyl napthalene; the polyvinylidene aromatics such as divinylbenzene; saturated alcohol esters such as methyl, ethyl, isopropyl or octyl alcohol esters of acrylic or methacrylic acid, vinyl acetate, diallyl maleate, and mixtures of one or more of said monomers. In general, the preferred monomer is a monovinyl aromatic, with styrene being most preferred.

The amount of copolymerizable monomer employed in preparing the vinyl ester resin and/or polyester resin is generally dependent on the specific components of the resin and its desired properties. In general, a vinyl ester resin will contain from 30 to 70 weight percent of the copolymerizable monomer, said weight percents being based on the total weight of the vinyl ester resin, including the copolymerizable monomer. Alternatively, an unsaturated polyester resin will generally contain from 30 to 60 weight percent of the copolymerizable monomer based on the total weight of the unsaturated polyester resin, including the copolymerizable monomer.

The accelerators and free-radical initiators suitably employed in the polymer concrete composition of the present invention are those free-radical initiators and accelerators free of transition metals, the selection and proportions of which are capable of setting and/or curing the resin to a suitably solid material having the desired physical and chemical properties.

The free-radical initiators suitably employed herein are those initiators which do not require the presence of a transition metal accelerator to be effective and, preferably, which are capable of generating free radicals at a temperature of 35° C. or below. Representative of free-radical initiators useful herein are certain organic peroxides such as dibenzoyl peroxide, dilauroyl peroxide, 1,1-bis tertiary butyl peroxycyclohexane, dicumyl peroxide and tertiary butylperoxyacetate. Preferred of such free radical initiators are dibenzoyl peroxide, tertiary butylperoxide benzoate, 1,1-bis tertiary butylperoxycyclohexane and tertiary butylperoxyacetate, with dibenzoyl peroxide being most preferred.

The accelerators are transition metal free compounds, which increase the rate at which the initiator decomposes to form free radicals. Compounds useful in the practice of the present invention as accelerators for the foregoing initiators include amines, preferably the aromatic amines such as dialkyl aniline and N,N-dialkyl toluidine. The preferred accelerators are dimethylaniline and N,N-dimethyl toluidene.

The specific accelerator and free-radical initiator and the concentrations at which they are most advantageously employed are dependent on a variety of factors including the specific vinyl ester or unsaturated polyester resin, accelerator and free-radical initiator employed, the desired speed of setting and/or curing, the amounts, if any, of a polymerization inhibitor contained by the vinyl ester or polyester, and the temperature at which setting and/or curing proceed.

For example, in filling concrete cutbacks, at the end of the indicated period of time, the polymer composition is sufficiently hard and possesses the other required physical properties such that the pipe having the filled concrete cutback can be further processed, e.g., fed over the rollers and subsequently laid on the ocean floor without damaging the filled cutback. Although the desired physical properties of the composition will vary depending on the specific end use application of the polymer concrete composition, when employed for filling girthweld concrete cutbacks, in general, the most important property of the polymer concrete composition in the pipe laying operation is its compressive strength. Alternatively, once the pipe is laid, the most important physical property is typically its impact strength.

Although the time limitations regarding curing and/or setting of the polymer concrete composition are not so restrictive in the lining of pipes, the preferred free-radical initiators and accelerators are typically the same as used in the composition for use in the filling of girthweld concrete cutbacks except that the most preferred accelerator is dimethylaniline. In the composition for use in lining pipes, the most preferred accelerator is N,N-dimethyltoluidine.

In general, the free-radical initiator is employed in an amount from 0.2 to 8, more preferably from 0.5 to 6, most preferably from 1 to 5, weight percent based on the total weight of the unsaturated polyester or vinyl ester resin, including any copolymerizable monomer contained in said resin. The accelerator is preferably employed in an amount from 0.05 to 2, more preferably from 0.1 to 1.5, weight percent based on the total weight of the unsaturated polyester or vinyl ester resin, including any copolymerizable monomer contained in the resin.

The filler portion of the polymer composition of this invention advantageously contains a particulate material such as sand. The particulate material may or may not contain water. Specifically, most commonly available sands contain some water, e.g., from 0.1 to 5 weight percent. In the practice of the present invention, it is not necessary to dry the particulate material prior to curing the composition.

In general, at least a portion of the particulate material useful as a filler in compositions of the present invention is advantageously a silicaceous material. A preferred particulate material is a fracturized product which exhibits an irregular shape (i.e., is somewhat sharp to the touch) such as sand derived from the crushing of a silicaceous material such as rock or a blend of silica flour and sand. Typically the blend will advantageously comprise particulates having particle sizes ranging from 0.001 to 10 millimeters (mm). Preferably, the particles will possess a particle size ranging from 0.02 to 5 mm. In a preferred composition, at least 50 percent by weight of the silicaceous material has a particle size of less than 1.19 mm. Alternatively, in the preparation of a polymer concrete composition for lining pipes, the blend will preferably comprise particles having a particle size ranging from 0.005 to 2, more preferably from 0.01 to 1 mm. Less preferably, so-called "beach sand" which has uniformly been rounded by the action of wind and/or water can be employed. However, this often results in poorer physical properties.

In addition to the silicaceous material, the filler portion of the polymer concrete composition can include other materials such as fly ash; glass fibers or matts; polymeric materials such as rubber and plastics, including expanded polymers; expanded mica and crushed stone or gravel components having particle sizing greater than those of sand. In general, sand or mixtures of sand with glass fibers or crushed stone are preferably employed as the filler, The amount of the vinyl ester resin or unsaturated polyester resin and the amount and type of filler materials employed in preparing the polymer concrete composition of the present invention are dependent on a variety of factors including the desired viscosity of the uncured formulation, the specific end use application and the desired properties such as the compressive strength and shrinkage during cure of the composition for such end use application. In general, the composition will comprise from 8 to 20 weight percent of the vinyl ester resin or unsaturated polyester resin, including any copolymerizable monomer, and from 80 to 92 weight percent of the filler, said weight percents being based on the total amount of vinyl ester or unsaturated polyester resin, including any copolymerizable monomer, and filler employed. Advantageously, the composition used for lining pipes will comprise from 10 to 35 weight percent of the vinyl ester resin or the unsaturated polyester resin, including any copolymerizable monomer, and from 65 to 90 weight percent of the filler.

In preparing the polymer concrete compositions of this invention, the individual components of the polymer concrete composition are mixed in an order such that the filler component is thoroughly wetted with the resin and the composition does not prematurely set or cure. Preferably, the vinyl ester resin or unsaturated polyester resin, optionally having either but not both, the free-radical initiator and accelerator mixed therewith, is advantageously mixed with the filler component at conditions which thoroughly wet the filler with the resin. Shortly prior to use (e.g., the introduction of the composition into a suitable mold to fill a girthweld concrete cutback), the accelerator and/or initiator not previously mixed with the resin is mixed with the filler/resin composition and the polymer concrete composition subsequently set and/or cured. The curing and setting of the composition can often take place at temperatures as low as 5° C. or up to temperatures of 75° C. or higher, with actual setting and/or curing temperatures being dependent on the specific application and desired rate of curing and/or setting of the composition. For example, in filling a girthweld concrete cutback, the curing or setting temperature will typically proceed at an ambient temperature normally encountered in a pipe laying operation, e.g., a temperature between 10° C. and 35° C., supplemented by any heat remaining from the welding operation.

Optionally, the polymer concrete composition can also contain various other adjuncts such as anti-shrink agents and lubricants.

In the lining of the interiors of pipes, the described composition is applied to the pipe by conventional coating techniques such as by rolling, spraying or brushing the composition onto the interior pipe surface. The composition is applied at a thickness of from 2 to 25 mm, preferably at a thickness of from 3 to 15 mm, more preferably of from 4 to 12 mm.

In the use of the composition for filling girthweld concrete cutbacks, although the polymer concrete composition can be employed with a non-reusable mold, the advantages of using the polymer composition of the present invention for filling girthweld concrete cutbacks are more generally recognized when a reusable mold, i.e., a mold which can be reused to fill more than one girthweld concrete cutback is employed.

Understanding of the mold and its operation is facilitated by reference to the drawing in which the FIGURE is an isometric view, partially in section, of one embodiment of the reusable mold of the present invention.

As depicted in the FIGURE, the mold comprises a separable sheath 10 which conforms generally and circumscribes the perimeter or circumference of a portion of a first coated conduit or pipe section 1 and a second coated conduit or pipe section 2. The coating at an end of each pipe section has been removed and the pipe sections welded together to form a girthweld concrete cutback 40. Although the separable sheath 10 can be produced from a variety of materials, in general, it is advantageously a thin metal sheet. The sheath 10 has an opening or fill port 21 to allow the introduction of a composition to fill the cavity defined by the sheath 10 and concrete cutback of the two pipe sections 1 and 2. In the illustrated embodiment, the separable sheath or cover is supported by a cradle 12 attached to a support member 13 having movable support arms 14. The cradle 12 is attached to a lifting means 11 which can be employed (in conjunction with movable arms 14) to raise and lower cradle 12.

The mold further comprises a closure means 20 for sealing the pipe sections in the sheath 10. Closure means 20 comprises a lever 30 pivotly mounted to one side of the sheath or cover means 10. In the illustrated embodiment, the closure means further comprises two clasping arrangements 31a and 31b, each clasp comprising a pivotly mounted hook, 32a and 32b, and an inflexible mounted catch, 33a and 33b, the hook and catch of each clasp being positioned on opposite sides of sheath 10.

The closure means 20 and separable sheath 10 operate such that in the closed position the entire circumference of the pipe is enclosed by the sheath except for opening 21 through which the filler composition can be introduced.

To insure a tight seal between the pipe and mold, one or more compressible sealing rings, e.g., compressive foam or rubber rings (not shown) can line the sheath. In such case, upon closure of the sheath, the compressible ring contacts the concrete coating of the pipe in a manner such that the ring tightly seals the sheath coated pipe combination.

In a typical operation, the girthweld cutback of the welded pipe sections 1 and 2 enters the mold such that the girthweld concrete cutback is located under the opening 21 in the sheath 10. The closure means 20 is engaged by catching hooks 32a and 32b with catches 33a and 33b and thereafter securely fastening the assembly by means of lever 30 to bring the sheath and/or the compressible ring in contact with the pipe sections 1 and 2. The composition which is employed in filling the girthweld concrete cutback is delivered through the opening 21 in sheath 10. An advantage of the polymer concrete composition is that it flows upon initial mixing for a short period of time, thereby enabling the composition to fill the girthweld concrete cutback prior to its setting and/or curing.

After the time required to sufficiently set and/or cure the composition in the filled cutback (typically less than 10 minutes using the polymer concrete composition of this invention), the mold is opened by disengaging the closure means by lifting lever 30. Cradle 12 is then lowered which causes separation of the separable sheath 10 thereby then releasing the contact between the sheath and the pipe sections. The now filled conduit is then moved forward. After releasing the filled girthweld cutback from the mold, it can immediately be processed further such as by traveling over rollers for installation on the ocean floor. A new welded conduit is brought into place such that a new girthweld concrete cutback to be filled is positioned under the opening in the mold. The cradle is again raised and the described procedure is then repeated.

The depicted embodiment is meant to illustrate the mold of the present invention and its operation and is not meant to limit its scope. Specifically, other sheaths and closure means which operate in a manner to give the desired results will readily be apparent to those skilled in the art and are included within the scope of the present invention. Variations in the size of the pipes can easily be compensated by modifying the closure means such as by employing a spring/lever combination. In addition, the various operations such as raising and lowering the cradle 12 and engaging or disengaging the closure means 20 are readily automated and also facilitated by employing properly designed hydraulic or pneumatic systems in place of the described manual operation.

The following examples are meant to illustrate the present invention and should not be construed to limit its scope. In the examples, all parts and percentages are by weight unless otherwise indicated.

Vinyl Ester Resin A is a vinyl ester resinstyrene blend containing 55 parts by weight of a vinyl ester prepared by reacting 1 equivalent of a glycidyl polyether of 2,2-bis(4-hydroxyphenyl) propane having an epoxy equivalent weight (EEW) of 535 and 1 equivalent of a glycidyl polyether of 2,2-bis(4-hydroxyphenyl)propane having an EEW of 188 with 1.75 equivalents of methacrylic and 0.25 equivalents of maleic anhydride in the presence of an esterification catalyst, and 45 parts by weight of styrene.

Vinyl Ester Resin B is a vinyl ester resinstyrene blend containing 50 parts by weight of the vinyl ester prepared in Vinyl Ester Resin A and 50 parts by weight of styrene.

Vinyl Ester Resin C is a vinyl ester resinstyrene blend containing 64 parts by weight of vinyl ester prepared by reacting 0.5 equivalent of a glycidyl polyether of a 2,2-bis(4-hydroxyphenyl)propane having an EEW of 188 and 1.5 equivalents of a glycidyl polyether of a phenol-formaldehyde novolac resin hving an EEW of 180 with two equivalents of methacrylic acid in the presence of an esterification catalyst, and 36 parts by weight of styrene.

Vinyl Ester Resin D in a vinyl ester resinstyrene blend containing 55 parts by weight of a vinyl ester prepared by reacting one equivalent of a glycidyl polyether of 2,2-bis(4-hydroxyphenyl)propane having an EEW of 425 and containing 16 percent by weight of a carboxy-terminated acrylonitrile-butadiene copolymer with 1 equivalent of methacrylic acid in the presence of an esterification catalyst, and 45 parts by weight of styrene.

EXAMPLE 1

A mild steel pipe having an outside diameter of 115 mm, a wall thickness of 7.5 mm and a length of 450 mm was cleaned, externally sand blasted and coated with an epoxy powder formulation which is then cured. A concrete coating of 30 mm thickness was then applied to the pipe. To simulate a cutback, a gap of 100 millimeters in the middle of the pipe was left uncoated. Prior to the cutback-fill operation, the pipe was heated in an oven to a temperature of approximately 120° C. which is typically the pipe temperature after the welding operation.

A thin flexible mold such as depicted in FIG. 1 was fitted around the cutback in the concrete coated pipe sample.

One hundred parts of a Vinyl Ester Resin A is mixed with 5 parts of a suspension containing 60 percent plasticizer and 40 percent dibenzoyl peroxide having a minimum active oxygen content of 2.6 percent, 0.37 part of N,N-dimethyltoluidine accelerator and 600 parts of a sand filler. The sand filler is a quartz sand, which is not dried prior to being mixed with the vinyl ester resin, containing between 1 and 2 percent water and having a particle size distribution such that 70 percent of the sand is greater than 0.3 mm, 24 percent has a size between 0.149 and 0.3 mm and 6 percent of the sand is less than 0.149 mm. The mixing was carried out using a heavy duty metal spatula for approximately 1 minute at which time the filler was thoroughly wetted with the resin. The polymer concrete composition was then quickly poured into the mold until it was full. Having filled the mold, the polymer concrete composition was allowed to set for approximately 5 minutes at room temperature. The mold is then removed without the cured composition sticking to the mold.

At this time, the polymer concrete composition was solid and easily capable of maintaining its shape without support or additional reinforcement. In fact, 60 minutes after removal of the filled pipe from the mold, the filled pipe was dropped from a height of 2 meters. The cement coating was broken. No damage was found in the cured polymer concrete composition.

The linear shrinkage of the composition was measured to be 0.1 percent and the coefficient of thermal expansion to be $20 \times 10^{-6}$ mm/mm° C.

To simulate the thermal shock which a filled girthweld cutback would experience in commercial practice, a second cutback is prepared in an identical manner as described above. This pipe was plunged into water cooled to 5° C. After 30 minutes emersion the pipe was withdrawn and found to be free of cracks and other defects.

Similar exceptional results were obtained with three pipes filled using identical techniques and polymer concrete composition as described except that, as a total replacement of the filler component, a quartz sand having a maximum particle size of (a) 4 mm, (b) 3 mm or (c) 2 mm was employed.

EXAMPLE 2

The method of Example 1 was repeated except that the polymer concrete composition comprised 100 parts of a vinyl ester resin comprising 50 percent of a Vinyl Ester Resin B, Vinyl Ester Resin C, 2.5 parts of the dibenzoyl peroxide suspension (1.0 parts of initiator); 0.3 part of the N,N-dimethyltoluidene and 600 parts of the quarts sand filler. This composition gave essentially equivalent results as that found in Example 1.

EXAMPLE 3

The method of Example 2 was repeated except the vinyl ester resin employed in preparing the polymer concrete composition was comprised of 90 percent of Vinyl Ester Resin B and 10 percent of Vinyl Ester Resin C. Essentially equivalent performance as found in Example 2 was obtained using said polymer composition.

EXAMPLE 4

Although the setting or curing rates of the composition were found to vary, similarly exceptionally joints were prepared using a polymer composition identical to that employed in Example 3 except the amounts of dibenzoyl peroxide initiator were varied from 2.4 to 3.6 parts per 100 parts of the vinyl ester resin component and the amounts of N,N-dimethyltoluidene were varied from 0.3 to 0.8 part per 100 parts of the vinyl ester resin component.

EXAMPLE 5

A concrete cutback was effectively filled using a polymer composition identical to that employed in Example 2 except a mixture of 90 percent of Vinyl Ester Resin B and 10 percent of Vinyl Ester Resin D was employed as the vinyl ester component.

COMPARATIVE EXAMPLE A

A concrete cutback was filled using a polymer concrete composition identical to that employed in Example 2 except that 0.03 part cobalt naphthenate and 0.05 part dimethylaniline were employed in place of the N,N-dimethyltoluidene as an accelerator and 1.5 parts methyl ethyl ketone peroxide was employed in place of the initiator. The sand was not dried prior to being mixed with the vinyl ester resin composition and contains between 1 and 2 percent water. After 10 minutes, the composition was not sufficiently set to allow further processing of the pipe.

COMPARATIVE EXAMPLE B

A concrete cutback was filled using a composition identical to that employed in Example 2 except that no accelerator was employed. Even after 60 minutes, the composition was not sufficiently set to allow further processing of the pipe.

EXAMPLE 6

A polymer composition was prepared by mixing 100 parts of Vinyl Ester Resin A with 0.37 parts of dimethylaniline and 450 parts of a sand filler. The sand filler is a quartz sand, which is not dried prior to being mixed with the vinyl ester resin, containing between 1 and 2 percent water and having particle sizes ranging from 0.05 to 1 mm. To prevent any premature curing and/or setting of the mixture, the free-radical initiator was not added at this time. The resulting mixture was fed to an extruder which was in fluid communication with a piece of spray equipment. To the extruder was added 5 parts of a suspension containing 60 percent plasticizer and 40 percent dibenzoyl peroxide having a minimum active oxygen content of 2.6 percent. The mixture was then immediately thereafter sprayed on the interior of a cleaned but not thoroughly dried concrete pipe. The mixture cured to form a continuous coating which adhered sufficiently to the interior.

What is claimed is:

1. A polymer concrete composition which contains no transition metal compounds and comprises a vinyl ester or unsaturated polyester resin, a peroxy-containing free-radical initiator, an aminecontaining accelerator and a filler, the composition comprising from 10 to 35 weight percent of the vinyl ester resin or the unsaturated polyester resin, including any copolymerizable monomer, and from 65 to 90 weight percent of the filler, said weight percents being based on the total amount of vinyl ester or unsaturated polyester resin, including any copolymerizable monomer, and filler employed; and from 0.2 to 8 weight percent of the free-radical initiator and from 0.05 to 2 weight percent of the amine-containing accelerator, the amounts of free-radical initiator and amine-containing accelerator based on the total weight of the unsaturated polyester or vinyl ester, including any copolymerizable monomer contained in the resins.

2. The composition of claim 1 wherein the free-radical initiator is dibenzoly peroxide, dilauryl peroxide, 1,1-bis tertiary butyl peroxy cyclohexane, dicumyl peroxide or tertiary butyl peroxy acetate.

3. The composition of claim 2 wherein at least a portion of the filler is a silicaceous material having a particle size from 0.02 to 5 millimeters.

4. The composition of claim 2 wherein the proportions of the initiator and the accelerator are such that the setting time of the composition is less than 10 minutes at 35° C.

5. A method for filling girthweld concrete cutbacks wherein the girthweld concrete cutback is filled with a polymer concrete composition of claim 1.

6. A method for lining a pipe wherein the pipe is lined with the polymer concrete composition of claim 1.

* * * * *